United States Patent [19]

D'Angelo et al.

[11] Patent Number: 5,663,626

[45] Date of Patent: Sep. 2, 1997

[54] APPLIED-VOLTAGE FUZZY CONTROL PROCESS FOR INDUCTION MOTORS AND DEVICE FOR PERFORMING IT

[75] Inventors: Giuseppe D'Angelo, Misterbianco; Rinaldo Poluzzi, Milan; Matteo Lo Presti, Misterbianco, all of Italy

[73] Assignees: SGS-Thomson Microelectronics S.r., Agrate Brianza; Consorzio per la Ricerca sulla Microelettronica nel Mezzogiorno, Catania, both of Italy

[21] Appl. No.: 496,895

[22] Filed: Jun. 30, 1995

[30] Foreign Application Priority Data

Jul. 1, 1994 [EP] European Pat. Off. ............. 94830327

[51] Int. Cl.$^6$ .................................................. G05B 13/02
[52] U.S. Cl. ........................................... 318/799; 318/811
[58] Field of Search .................................. 318/798–803, 318/807–811; 395/61, 81; 384/163

[56] References Cited

U.S. PATENT DOCUMENTS

| | | |
|---|---|---|
| 3,936,226 | 2/1976 | Harner et al. .......................... 416/28 |
| 5,272,428 | 12/1993 | Spiegel et al. ........................ 318/803 |
| 5,476,430 | 12/1995 | Lee et al. .............................. 482/54 |

FOREIGN PATENT DOCUMENTS 2 264 369  8/1993  United Kingdom.

OTHER PUBLICATIONS

European Search Report from European Patent Application No. 94830327.6, filed Jul. 1, 1994.

IEEE International Conference On Fuzzy Systems, Aug. 3, 1992, San Diego USA pp. 843–850, J. Cleland & AL. "Fuzzy Logic Control Of AC Induction Motors".

*Primary Examiner*—Brian Sircus
*Attorney, Agent, or Firm*—Wolf, Greenfield & Sacks, P.C.; James H. Morris

[57] ABSTRACT

The present invention relates to an applied-voltage fuzzy control process for induction motors including the following steps: measuring a speed error by comparing the current speed of an electric motor with a reference speed; generating the derivative of this speed error; measuring a power error by comparing the power supplied to the motor with a reference power; applying a fuzzy control to the speed error, to the derivative of the speed error, and to the power error so as to generate the values of a drive voltage and a power supply pulse that are suitable to drive the electric motor. The fuzzy control is divided into two sections: a first one for motor speed control and a second one for motor power control.

24 Claims, 8 Drawing Sheets

APPLIED-VOLTAGE FUZZY CONTROL PROCESS FOR INDUCTION MOTORS AND DEVICE FOR PERFORMING IT

BACKGROUND OF THE INVENTION

1. Field of the Invention

The present invention relates to an applied-voltage fuzzy control process for induction motors and to a related fuzzy controller.

2. Discussion of the Related Art

As is known, an electric drive system is a system capable of converting electric power supplied in input into mechanical power. These systems generally include three main subsystems: an electric motor, a control system and a power system. The electric motor is the element which enable conversion of the energy. The development of drive circuits that has taken place in recent decades has increased interest at the industrial level in the class of alternating-current motors. The characteristics that cause them to be preferred are mechanical strength, low moment of inertia, and low manufacturing and maintenance cost.

The control system must generate the control signals on the basis of a comparison between measured signals and reference signals, simultaneously compensating for parametric changes produced for example by saturations and/or temperature variations.

Control systems can be produced using digital and analog technology. The current trend is to develop digital control systems, which achieve better performance, have sophisticated control techniques, and flexibility in interfacing with automation and diagnostics systems.

The power block, which supplies power to the motor in the manner described by the control system, includes an inverter used in AC drives. Inverters can be classified according to the variable that they control, and thus as applied-current and as applied-voltage inverters, or according to the waveform of the applied variable.

Figure 7:
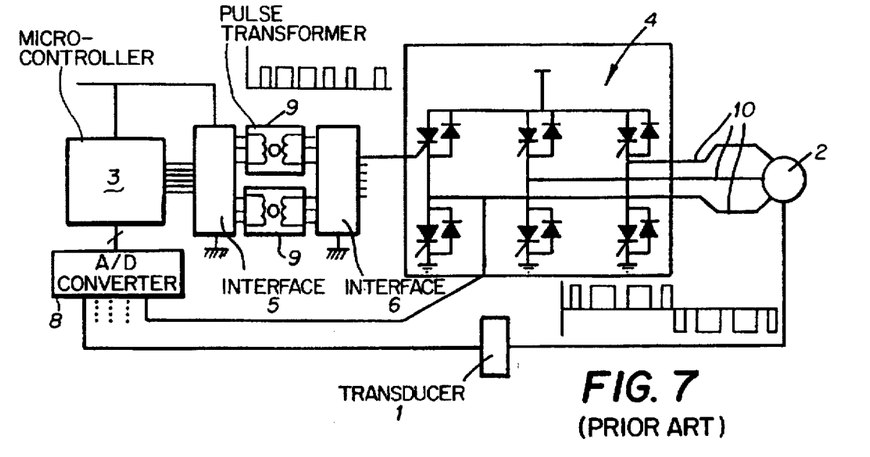
FIG. 7 is a schematic diagram of an electric diagram of a known control system.

FIG. 7 illustrates a known control system. This figure shows the various blocks that compose the control system. The blocks include the conversion block, the control block, the signal-command separation block, and the power block.

The conversion block includes a transducer 1 (encoder) which is suitable to convert the speed of an AC electric motor 2 into an electric signal. These signals, which are generally analog, are transferred to the processing units.

The control block, including the microcontroller 3, receives the electric signals, appropriately converted into digital form by an A/D converter 8, from the conversion block, and determines, on the basis of these signals, the sequence of the control signals to be transmitted to the gates of the power devices 4 of the power block so as to apply the desired power supply frequency and voltage to the AC motor 2.

The signal-command separation block, including two interfaces 5 and 6 and pulse transformers or optoisolators 9 interposed between them, prevents the switchings that affect the power switching devices from introducing noise in the signal section, i.e. in the control logic section.

The power block, which includes the power device 4 (triac, IJBT, MOSFET, etc.), applies the desired set of three voltages to the phases 10 of the motor.

The speed control of the AC motor 2 within the allowable value range can be divided into two sections: the first section provides a constant-torque operation, whereas the second section provides a constant-power operation. A frequency-controlled asynchronous motor operates with constant torque if a proportionality rule is set between the voltage V and the power supply frequency w; this rule is expressed by the function V=Kw, where K is a constant.

The advantage linked to the use of this control technique is simplicity in execution, which reduces operating costs, especially when used in industrial-type systems. However, these systems are not very precise and resistant, and their use is therefore limited.

In order to obviate these problems, solutions have been proposed where additional measurements are performed, introducing compensation devices that correct parameter changes and solve stability problems. The use of this type of strategy compromises the essential characteristics of this type of control, i.e. simplicity and cost.

Known AC motor control systems have other drawbacks.

For example, locking onto a given set point is often too slow, especially when it is necessary to have small overshooting. Also, the locking time is too long in present systems when the operating conditions vary and it is desirable to have a small steady-state error.

One aim of the present invention is to provide an applied-voltage fuzzy control process for induction motors and a related fuzzy controller which can improve the performance of conventional control systems.

Within the scope of this aim, an object of the present invention is to provide a process that allows fast locking onto a given set point with small overshooting.

Another object of the present invention is to provide a process which allows a minimal locking time when the operating conditions vary.

Another object of the present invention is to provide a process which allows a limited steady-state error.

Another object of the present invention is to provide a process which provides more robust control with respect to known systems.

Another object of the present invention is to provide a process, and the device for performing it, which are highly reliable and are relatively easy and inexpensive to manufacture.

SUMMARY OF THE INVENTION

This aim, these objects and others which will become apparent hereinafter are achieved by an applied-voltage fuzzy control process for induction motors, that includes the following steps: the measurement of a speed error produced by the comparison between the current speed of an electric motor and a reference speed; the generation of the derivative of this speed error; the measurement of a power error generated by the comparison between the power supplied to the motor and a reference power; the application of a fuzzy control to the speed error, to the derivative of the speed error, and to the power error so as to generate the value of the voltage and pulse that is suitable to drive the electric motor.

BRIEF DESCRIPTION OF THE DRAWINGS

The characteristics and advantages of the invention will become apparent from the description of a preferred but not exclusive embodiment, illustrated only by way of a non-limitative example in the accompanying drawings, wherein.

DETAILED DESCRIPTION

In order to better explain the inventive concept of the present invention, it is necessary to make an introductory premise on the fuzzy-logic control technique, which is used in the process and the device according to the present invention.

Fuzzy logic, differently from systems based on classical logic, attempts to model the reasoning methods that are typical of the human mind, for making rational decisions in uncertain and inaccurate environments. Fuzzy logic offers a set of rules which can cope with non-exact facts expressed by means of the semantics of a linguistic method. The basic concepts of fuzzy logic are linguistic variables and fuzzy sets, the latter being characterized by membership functions.

Fuzzy logic allows to working with linguistic descriptions of reality; this means that a problem is not characterized exactly (like a mathematical model) but is given as a linguistic representation of an algorithm. A particular class of variables, known as linguistic variables, is used to represent the information that becomes available during the linguistic description step. Linguistic variables are characterized by the type of values that can be assigned to them: the kind of word includes words or sentences in any natural or artificial language.

Accordingly, linguistic variables contain the semantic meaning of the sentences used in modelling the problem. A set of values that depends on the selected variable can be found for each linguistic variable. This set can assume different meanings according to the context in which it is used, For each linguistic variable it is possible to provide a table that summarizes all the values that the variable can assume. These values can generally be obtained by applying appropriate modifiers to a primary term, which represents the variable or to its opposite. The following table provides an example.

| Linguistic variable | name: TEMPERATURE |
|---|---|
| Primary term | COLD |
| Opposite | WARM |
| Modifiers | NOT, VERY, MORE, or LESS |

Figure 1:
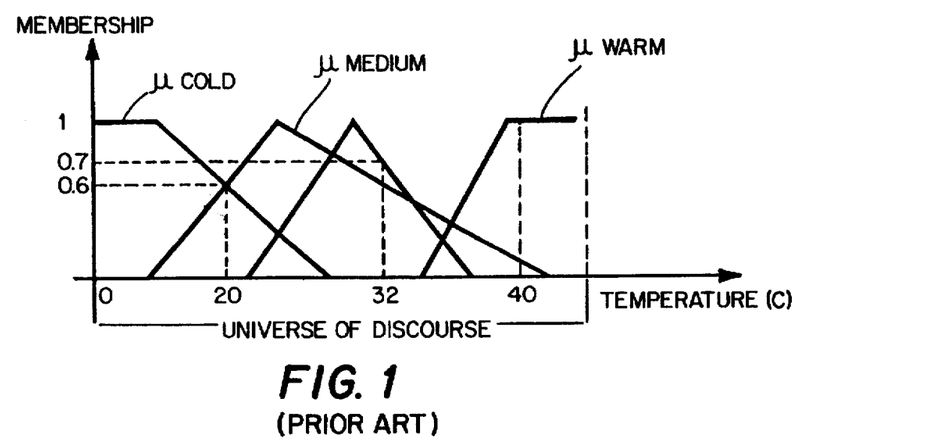
FIG. 1 is a graph showing an example of a fuzzy set and of degrees of membership functions.

Fuzzy sets and the associated membership functions are closely linked to the above mentioned linguistic variables. Each value assigned to a linguistic variable is in fact represented by a fuzzy set. A fuzzy set can be considered as a distribution of possibilities that links a particular value of a linguistic variable to a definition domain (the universe of discourse). If a fuzzy set is plotted on a chart, as in FIG. 1, the degrees of membership (or truths) are plotted on the axis of ordinates, whereas the universe of discourse, i.e. the definition domain of the fuzzy variable (in this case, the temperature and the related fuzzy set), is plotted on the axis of abscissasN This domain can be a continuous space $\{x\}$ or a discretized representation $\{x1 \ldots x2\}$. For example, if X is a temperature, $\{X\}$ represents its range of variability, whereas $\{x1 \ldots x2\}$ represents the discrete values that characterize it.

Membership functions $\mu(x)$ are functions that identify a fuzzy set in the universe of discourse that is characteristic of a linguistic variable and associate a degree of membership of a given value to the fuzzy set for each point of the definition domain (universe of discourse), accordingly mapping the universe of discourse in the interval [0,1]. A membership value $\mu(x)=o$ indicates that point x is not a member of the fuzzy set being considered, which is identified by the function $\mu$, whereas a value $\mu(x)=1$ indicates that the value x certainly belongs to the fuzzy set. Membership functions are entities on which fuzzy computation is performed; this computation is performed by means of appropriate operations on the sets represented by the membership functions.

Figure 2:
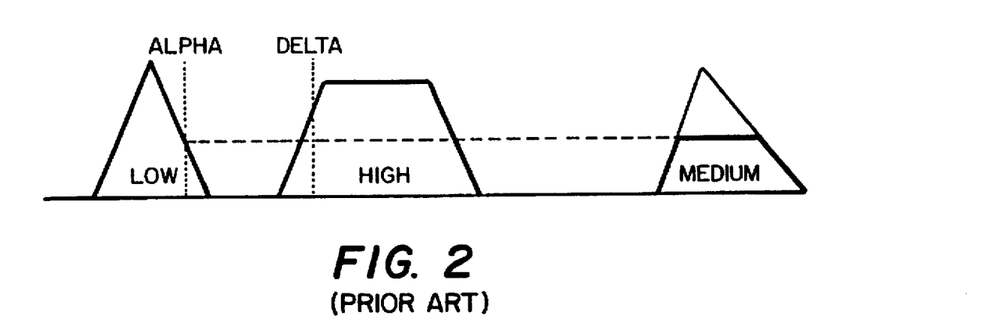
FIG. 2 is a graph showing an example of MAX/MIN fuzzy inference.

The collection of all the fuzzy sets of a linguistic variable is defined as "term set" FIG. 2 summarizes the definitions given earlier. FIG. 2, for the sake of graphic simplicity, plots triangular membership functions μcold, μmedium and μwarm which can generally be represented by any linear or non-linear function.

The adoption of a particular computational model is one of the factors that affects the performance of the device. However, the process for the fuzzy control of induction motors according to the present invention can be implemented with any fuzzy computational model. Examples of these computational models will be described hereinafter.

At high level, a fuzzy program is a set of rules of the IF-THEN type. The following example shows a set of three rules with two inputs (A and B) and two outputs (C and D). The various terms A1, A2 . . . D3 represent the knowledge of the system, obtained from expert technicians or in other ways, in the form of membership functions:

rule 1: IF [(A is A1)] AND (B is B1)] THEN [(C1 is $C_1$) AND (D1 is $D_1$)]

rule 2: IF [(A is A2)] AND (B is B2)] THEN [(C2 is $C_2$) AND (D2 is $D_2$)]

rule 3: IF [(A is A3)] AND (B is B3)] THEN [(C3 is $C_3$) AND (D3 is $D_3$)]

The part of each rule that precedes the THEN term is commonly referred to as "left part" or "antecedent", whereas the part that follows the THEN term is referred to as "consequent" or "right part". The inputs A and B, after being appropriately fuzzified, i.e. converted into membership functions, are sent-to the rules to be compared with the premises stored in the memory of the control device (the IF parts). Multiple rules are combined simply by means of a fuzzy union operation on the membership functions that are the result of each rule. Conceptually, the better the equalization of the inputs with the membership function of a stored rule, the higher the influence that the rule has in overall computation. In order to determine this equalization, weight functions which identify some particularly indicative values are determined. One of these weight functions is the function $\alpha$, which indicates the extent to which the input propositions (A1, B1) match the stored premises (A, B). In the above example of rules, the function $\alpha$ is given as $$\alpha_i A = \max(\min(A1, A_i))$$

$$\alpha_i B = \max(\min(B1, B_i))$$

for 1, 2, 3 (number of rules).

The second weight function is $\Omega_i$, which indicates the extent of the "general resemblance" of the IF part of a rule. For the above example, the function $\Omega_i$ is calculated as $$\Omega_i = \min(\alpha_i A, \alpha_i B, \ldots)$$

for i equal to the number of rules and with as many items inside the parenthesis as there are propositions (the IF part) of each rule. As an alternative to the above membership function, a weight function equal to the product of the various membership values is usually used:

$$\Omega_i = \alpha_i A \times \alpha_i B$$

Figure 3:
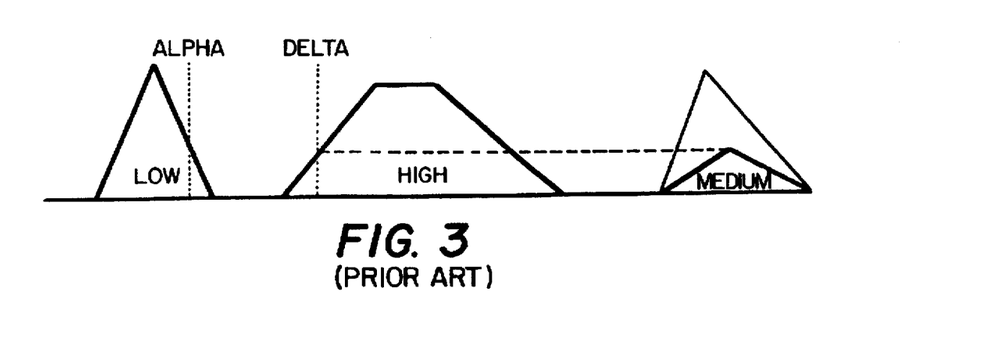
FIG. 3 is a graph showing an example of MAX/DOT fuzzy inference.

These values, which in practice define the activation value of the antecedent part of the fuzzy inference, are used subsequently to calculate the activation value of the consequent (i.e. of the right part). Two different inference methods are generally considered: MAX/DOT and MAX/MIN. Essentially, both methods act by modifying the membership functions of the consequent by means of a threshold value which is supplied by the antecedent. The MAX/MIN method acts by clipping the membership functions related to the consequent in the manner shown in FIG. 3. The rule of the fuzzy inference of FIG. 3 is as follows:

IF alpha IS low AND delta IS high THEN gamma IS medium

Regarding the input values "alpha" and "delta" one uses the related lower (threshold) membership value with which the membership function of the output "gamma" is clipped. In practice, the membership function in the output will have no value higher than the threshold value.

Figure 4:
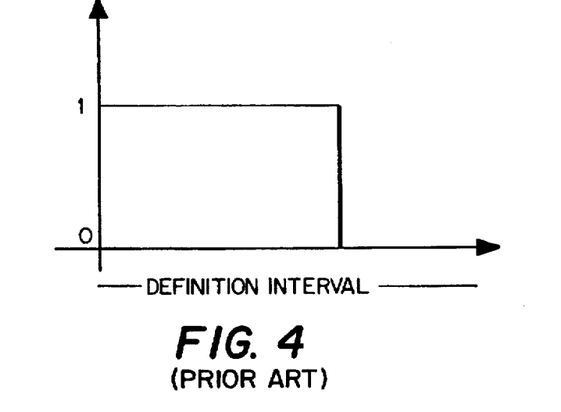
FIG. 4 is a graph showing an example of a crisp-type membership function.

The MAX/DOT method instead acts by modifying the membership functions of the right part (the consequent), so that the membership function of the output is "compressed", while attempting to maintain its original shape as much as possible. The MAX/DOT method for the same rule as above is shown in FIG. 4.

The choice of the described methods is linked to the type of device used to implement the fuzzy regulator. In any case it should be noted that the type of inference used is irrelevant for the AC motor fuzzy controller of the invention. The choice of one method or the other depends on the device used to physically implement the fuzzy controller.

In the case of fuzzy control it is possible to simplify the computation of the weights $\alpha$. It is in fact possible to considerably reduce the amount of computation by assuming that one is dealing with a degenerate case of fuzzy calculus in which the input variables are not fuzzy sets (ambiguous values) but are variables which generally originate from sensors and are thus definite numeric values. The input data does not include fuzzy sets but rather, crisp values.

Figure 5:
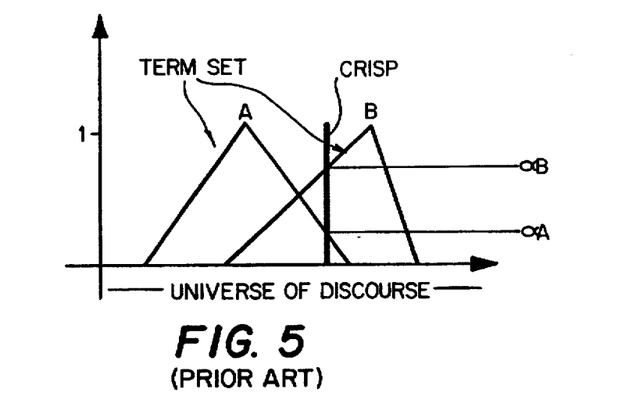
FIG. 5 is a graph showing an example of fuzzy calculus with crisp values.

In order to represent these values within a fuzzy system, they must be converted into crisp membership functions, i.e. into particular membership functions which have an activation value of 1 ("TRUE") at the point which corresponds to the input value provided. Equally, these crisp values have a zero ("FALSE") value in the remaining part of the definition interval. This concept is shown in FIG. 5.

In order to convert a physical value, provided for example by an external sensor, into a fuzzy value, it is thus sufficient to assign the maximum truth value that is characteristic of the system to the point of the definition interval that is identified by the measured value. With reference to computation, this means that the case shown in FIG. 6 always occurs.

Figure 6:
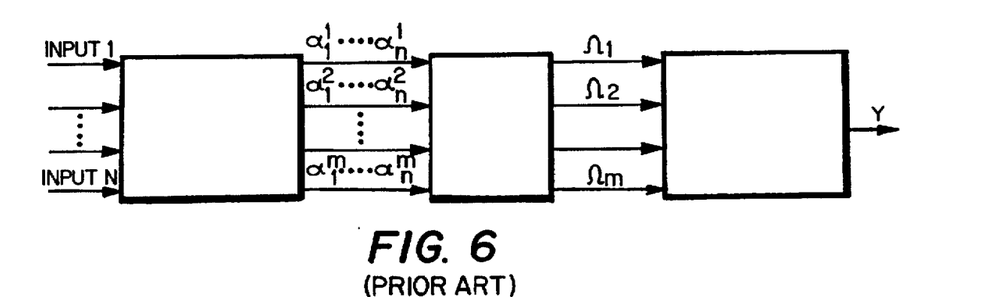
FIG. 6 is a block diagram of an exemplary fuzzy computational model.

Computation of the weights $\alpha$ in the particular case of FIG. 6, where there are crisp values such as those that occur in the case of machines that control physical values, is reduced to finding the intersection $\alpha_B$ and $\alpha_A$ Of the input variables with the membership functions imposed by the term sets A and B. The weights thus computed are then used for computation on the consequent of the fuzzy inference (i.e. on the fuzzy rules).

It should be noted that for control systems used with the present invention, the output of the fuzzy regulator must be a definite physical value of the control rule. Generally, once the inference has been performed on the right part of the fuzzy rule, one obtains a fuzzy set; it is accordingly necessary to defuzzify, i.e. to extract a definite numeric value from the calculated fuzzy set. There are various defuzzification methods, such as the centroid method, the maximum height method, etc. In practice, for reasons related to numeric precision the most widely used method is the centroid method, according to which:

$$y = \frac{\sum_{1}^{n} \Omega_i \cdot C_i}{\sum_{1}^{n} \Omega_i}$$

where n is the number of rules and C represents the centroids (centers of gravity) of the membership functions of the consequents,of each rule, appropriately modified by using the MAX/MIN or MAX/DOT method. The functions Q are determined as described earlier, using either the minimum among the functions $\alpha$ or the product thereof. This computational model is referred to as the MAMDANI computational model. As an alternative, it is also possible to use another alternative fuzzy computational model, referred to as the SUGENO model, in which defuzzification is performed simply by means of the following rule:

$$y = \sum_{i=1}^{n} \Omega_i \cdot \alpha_i$$

In the above equation, $\Omega_0$ is always equal to 1. In practice, the defuzzified value is determined by a linear combination of the activation values of each individual rule.

With reference to FIG. 7, in the case of a fuzzy controller, the input values are numeric values (input 1-n) which originate from sensors. In this case it is necessary to fuzzify these values to obtain fuzzy values $\alpha$, apply the fuzzy inference (the rules) to obtain the weight functions $\Omega$ of the fuzzy values, and finally defuzzify these weight functions $\Omega$ so as to obtain a definite numeric value y in output.

Figure 8:
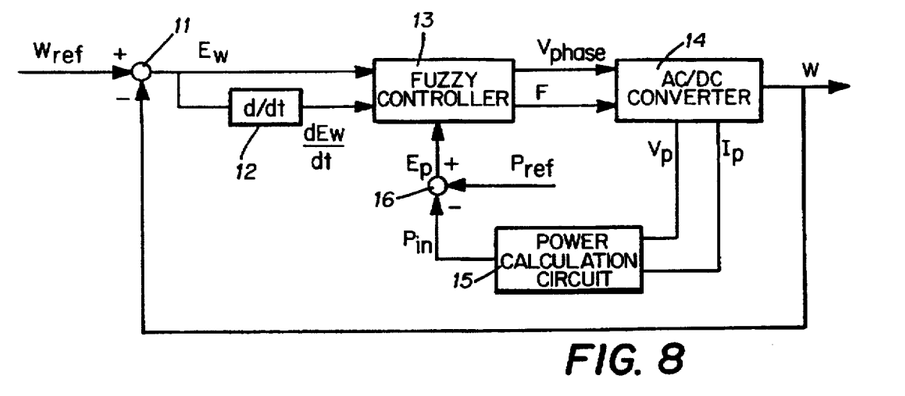
FIG. 8 is a block diagram of the control system according to the present invention.

The control system according to the present invention is shown in FIG. 8. A signal $w_{ref}$ which represents the reference speed, is sent to a comparison node 11. The same node 11 also receives a signal which represents the speed w that drives the AC motor. The node 11 is suitable to subtract the signal which represents the current speed w from the signal that represents the reference speed $w_{ref}$. In this manner, the node 11 is suitable to generate the difference $w_{ref}-w$, i.e. an error $E_w$. The error signal $E_w$ is sent to a fuzzy controller 13. At the same time, the error signal $E_w$ is sent to a differential circuit 12 which is suitable to generate the derivative $dE_w/dt$ of the error signal $E_w$. The derivative $dE/dt$ is sent to the fuzzy controller 13.

On the other side, an AC/DC converter 14, which provides the signal w that represents the speed that drives the AC motor, generates the voltage value $V_p$ and the current value $I_p$ which drive the motor. The current and voltage values are sent to a power calculation circuit 15 which is suitable to generate a signal P that represents the power supplied to the AC motor. The signal $P_{in}$ is sent to a second comparison node 16 which is suitable to compare the supplied power signal $P_{in}$ with a signal that represents a reference power $P_{ref}$. The node 16 is suitable to generate a power error signal E which is the third input of the fuzzy controller 13.

The fuzzy controller is suitable to generate a voltage $V_{phase}$ which is suitable to drive the AC motor, and a power supply pulse signal F. In this manner, the fuzzy controller 13, on the basis of the measurements of the indicated values (angular speed w and supplied power $P_{in}$), is suitable to determine the effective value of the voltage $V_{phase}$ and the power supply frequency F.

Figure 9:
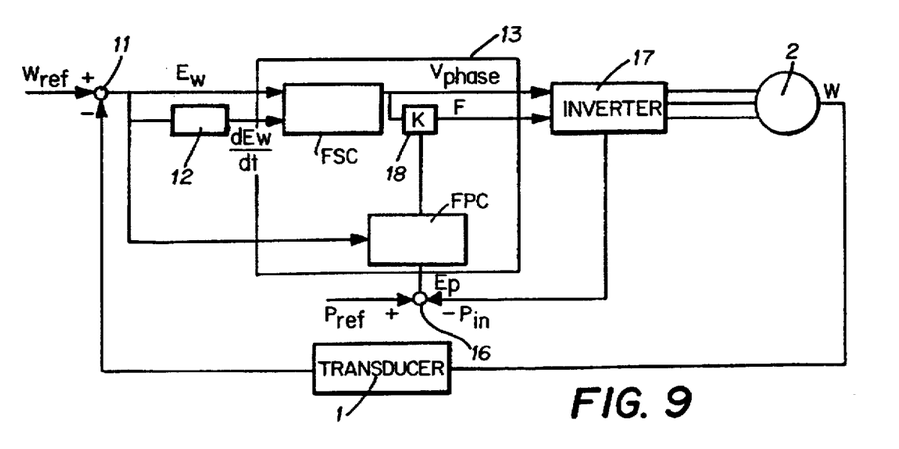
FIG. 9 is a block diagram of the control system according to the present invention.

FIG. 9 illustrates a more detailed execution of the control system according to the present invention. The fuzzy controller 13 of FIG. 9 comprises two main components: the fuzzy speed controller FSC and the fuzzy power controller FPC. The fuzzy speed controller FSC receives as inputs the speed error $E_w$ and the derivative $dE_w/dt$ of this error. The output of the controller FSC is the effective value of the voltage $V_{phase}$. The fuzzy power controller receives as inputs the speed error $E_w$ and the power error $E_p$ generated by the difference ($P_{ref}-P_{in}$). The value of the power $P_{in}$ supplied to the motor 2 is obtained by an inverter 17 which is suitable to, drive the AC motor 2.

The output of the fuzzy power controller FPC includes a value K which determines the ratio between the effective value of the voltage $V_{phase}$ and the power supply pulse F. The value K is sent to a multiplier circuit 18 which is suitable to multiply the value $V_{phase}$ by the value of the parameter K so as to generate the value of the power supply pulse F. The values of the effective value $V_{phase}$ and of the pulse F ($K \times V_{phase}$) are sent to the inverter 17, which drives the AC motor 2.

The input variables of the fuzzy speed controller FSC are the speed error $E_w$ with respect to a set point and the derivative $dE_w/dt$ of this error. The output of the controller FSC, as mentioned, is the voltage $V_{phase}$ which is suitable to drive the AC motor 2. The rules of the FSC are of the following kind:

IF $E_w$ IS ... AND $dE_w/dt$ IS ... THEN $V_{phase}$ IS ...

Examples of fuzzy rules developed for the fuzzy speed controller are as follows:
IF $E_w$ IS N AND $dE_w/dt$ IS Ns THEN $V_{phase}$ IS Pss
IF $E_w$ IS N AND $dE_w/dt$ IS Z THEN $V_{phase}$ IS P
IF $E_w$ IS N AND $dE_w/dt$ IS Ps THEN $V_{phase}$ IS Ps
IF $E_w$ IS N AND $dE_w/dt$ IS P THEN $V_{phase}$ IS Pls
IF $E_w$ IS Ns AND $dE_w/dt$ IS N THEN $V_{phase}$ IS Ps
IF $E_w$ IS Ns AND $dE_w/dt$ IS Ns THEN $V_{phase}$ IS Phm
IF $E_w$ IS Ns AND $dE_w/dt$ IS Z THEN $V_{phase}$ IS Vhm
IF $E_w$ IS NS AND $dE_w/dt$ IS Ps THEN $V_{phase}$ IS Vh
IF $E_w$ IS Ns AND $dE_w/dt$ IS P THEN $V_{phase}$ IS VVhm
IF $E_w$ IS Z AND $dE_w/dt$ IS Ns THEN $V_{phase}$ IS VVh
IF $E_w$ IS Z AND $dE_w/dt$ IS Ps THEN $V_{phase}$ IS VVhs
IF $E_w$ IS Ps AND $dE_w/dt$ IS N THEN $V_{phase}$ IS Ph
IF $E_w$ IS Ps AND $dE_w/dt$ IS Ns THEN $V_{phase}$ IS Plm
IF $E_w$ IS Ps AND $dE_w/dt$ IS Z THEN $V_{phase}$ is z
IF $E_w$ IS Ps AND $dE_w/dt$ IS Ps THEN $V_{phase}$ IS Pss
IF $E_w$ IS Ps AND $dE_w/dt$ IS P THEN $V_{phase}$ IS P
IF $E_w$ IS P AND $dE_w/dt$ IS N THEN $V_{phase}$ IS Ps
IF $E_w$ IS P AND $dE_w/dt$ IS Ns THEN $V_{phase}$ IS Pls
IF $E_w$ IS P AND $dE_w/dt$ IS Z THEN $V_{phase}$ IS Pls
IF $E_w$ IS P AND $dE_w/dt$ IS Ps THEN $V_{phase}$ IS Phm where in the antecedent, N is Negative, Ns is Negative small, Z is Zero, Ps is Positive small, and P is Positive, and in the consequent, Pss is Positive small small, Ps is Positive small, P is Positive, Vh is Very high, VVh is Very Very high, etc.

Figure 10:
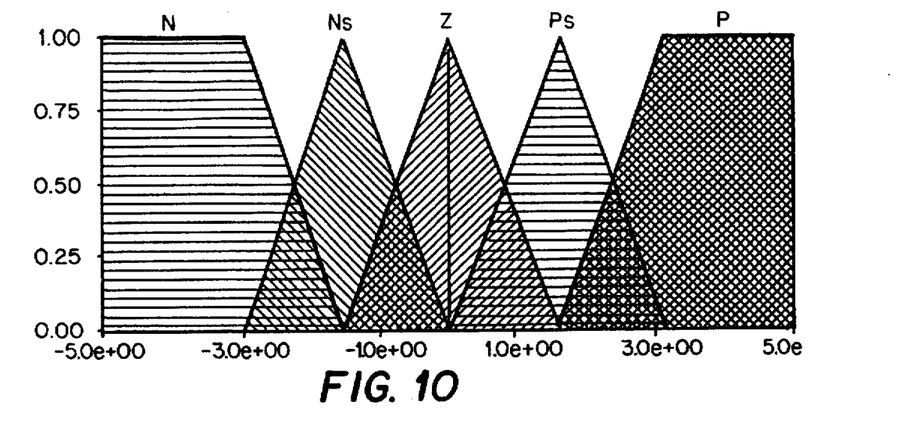
FIG. 10 is a graph that plots the membership functions of the speed error variable of the fuzzy speed controller FSC.
Figure 11:
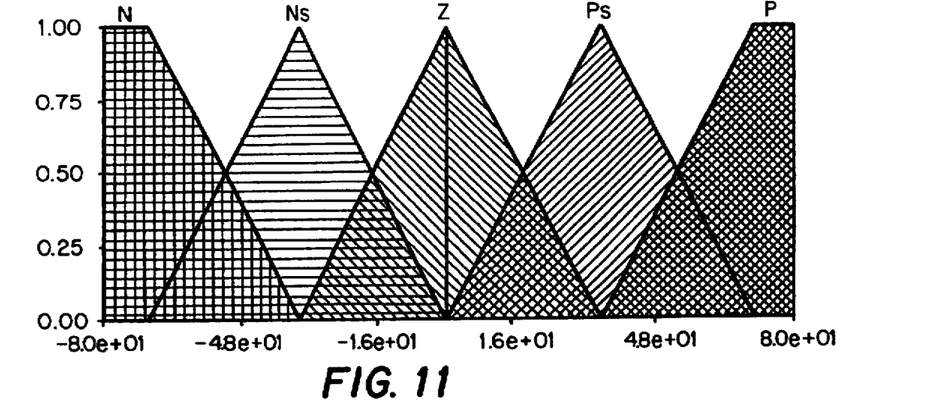
FIG. 11 is a graph that plots the membership functions of the speed error variation variable of the fuzzy speed controller FSC.
Figure 12:
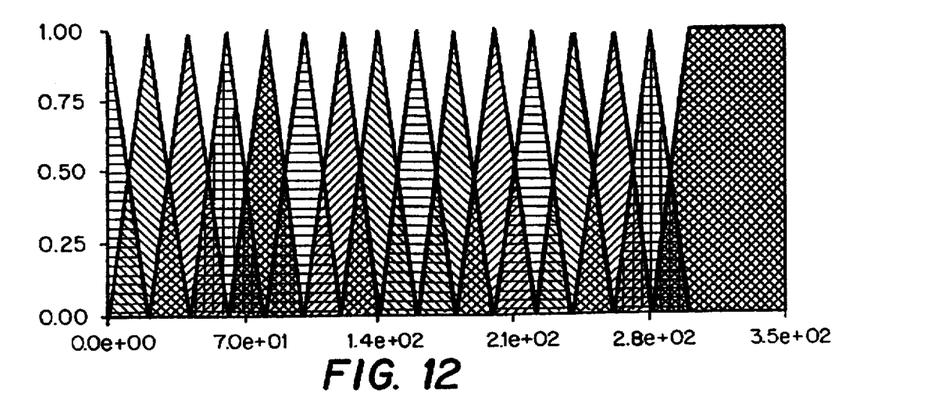
FIG. 12 is a graph that plots the membership functions of the output variable $V_{phase}$ of the fuzzy speed controller FSC.

The related membership functions of the speed error $E_w$ are shown in FIG. 10. The membership functions for the derivative $dE_w/dt$ of the speed error are shown in FIG. 11, and the membership functions for the output variable Vphase are shown in FIG. 12. For the fuzzy power controller FPC, the input variables are the speed error $E_w$ and the power error $E_p$, whereas the output is the value K. The form of the fuzzy rules is:

If Ep IS ... AND $E_w$ IS ... THEN K IS ...

Rules have been developed for the fuzzy power controller similarly to the case of the fuzzy speed controller.

Figure 13:
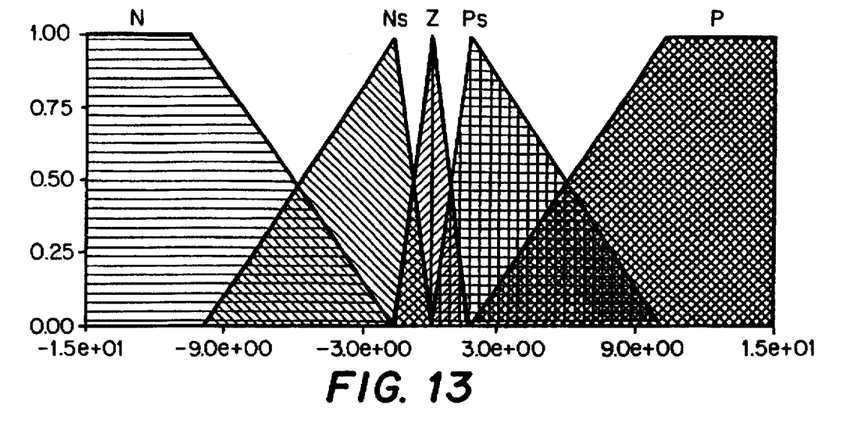
FIG. 13 is a graph that plots the membership functions of the speed error variable of the fuzzy power controller FPC.
Figure 14:
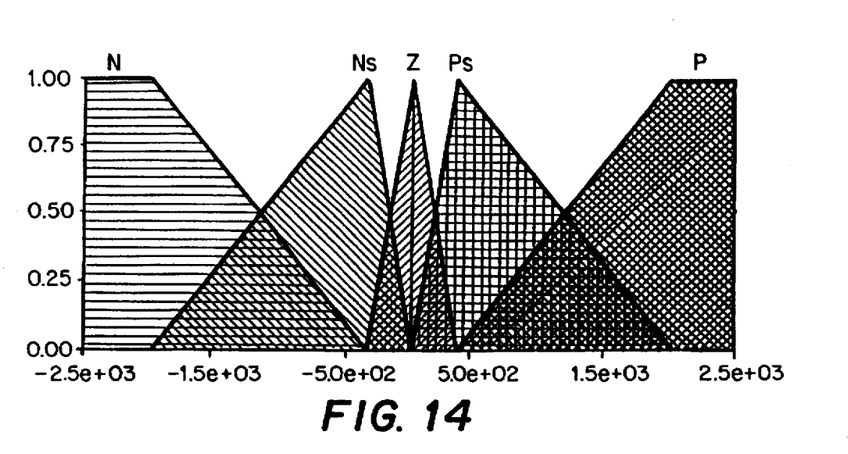
FIG. 14 is a graph that plots the membership functions of the power error variable of the fuzzy power controller FPC.
Figure 15:
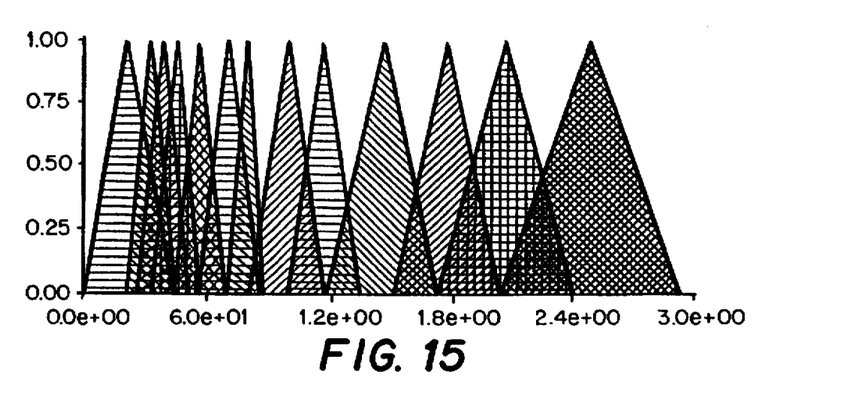
FIG. 15 is a graph that plots the membership functions of the output variable of the fuzzy power controller FPC.
Figure 16A:
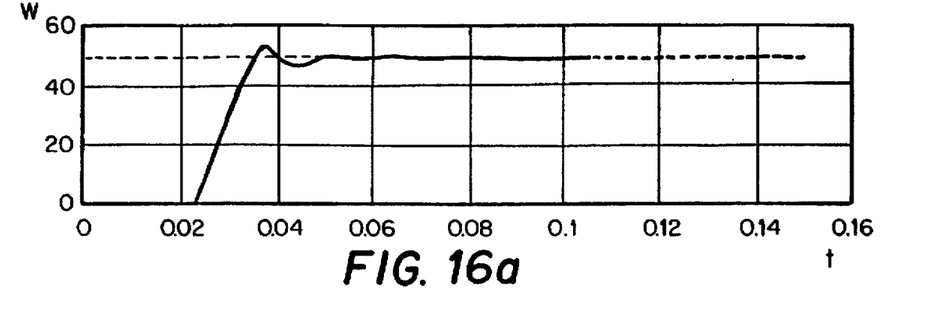
FIGS. 16a and 16b are graphs that plot rotor speed controlled with the process according to the present invention.
Figure 16B:
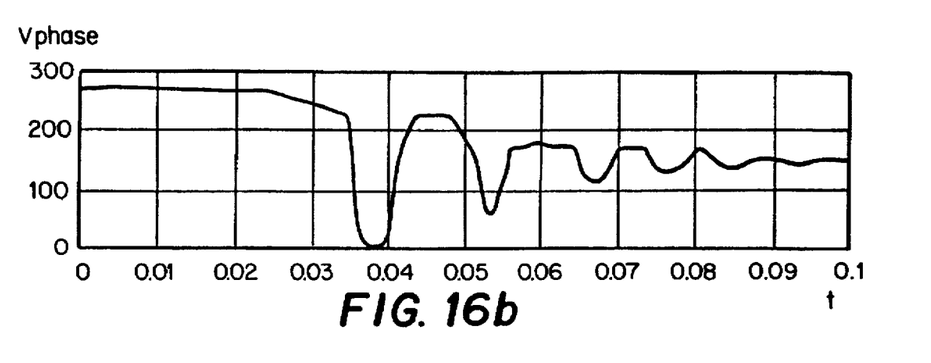
Figure 17A:
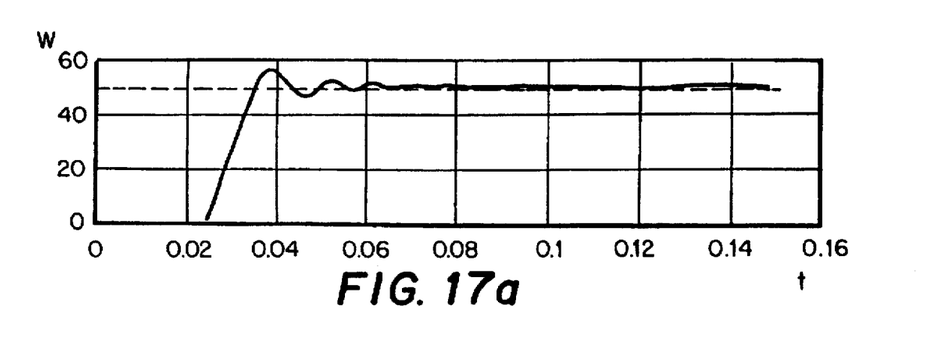
FIGS. 17a and 17b are graphs that plot rotor speed controlled with a known control system.
Figure 17B:
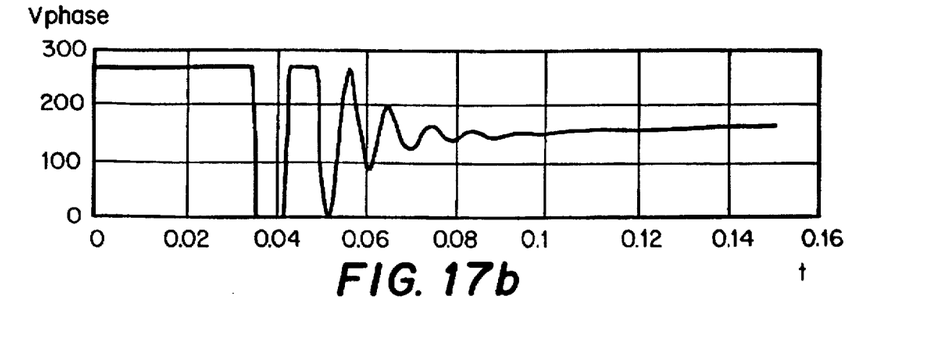

The related membership functions of the speed error $E_w$ are shown in FIG. 13. The membership functions for the power error are shown in FIG. 14, and the membership functions for the output variable K are shown in FIG. 15. The measured values of the linguistic variables are applied to the fuzzy rules for the controller FSC and for the controller FPC by means of the fuzzy inference as described earlier.

If triangular and symmetrical membership functions are chosen for the consequents, the values of the respective centroids are independent of the activation value of the antecedents. Accordingly, it is possible to consider the consequence with constant values $C_i$ (of the centroid). The defuzzification rule in this case assumes the following form:

$$y = \frac{\sum\limits_{1}^{n} \Omega_i \cdot C_i}{\sum\limits_{1}^{n} \Omega_i}$$

where n is the number of rules and Ωi represents the degrees of activation of each rule; these are typically calculated by considering the lowest among the activation values of the membership functions of the linguistic variables of the antecedents with the above described formula:

Ω=min(αE$_w$, αdE$_w$/dt)

for the fuzzy speed controller FSC; and

Ω=min(αE$_w$, αE$_p$)

for the power controller FPC.

Figures 21, 22:
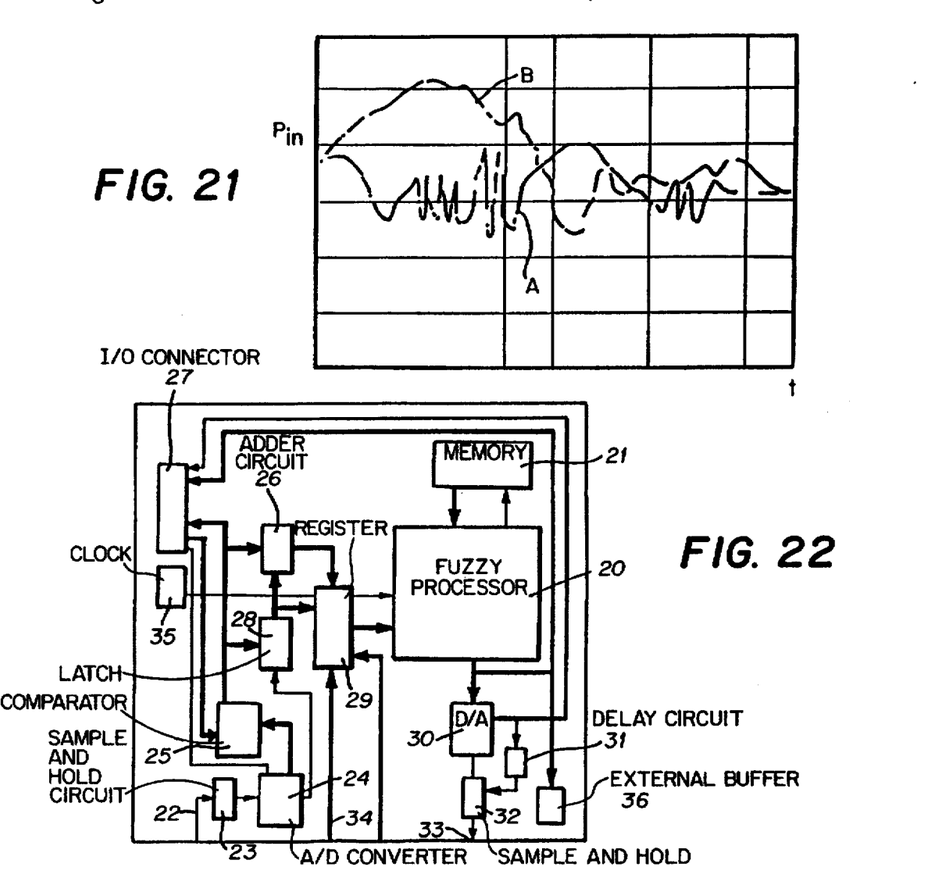
FIG. 21 is a graph that plots the comparison of the power values supplied to the motor in the two different configurations.
FIG. 22 illustrates a control device according to the invention.

The implementation of the control device is shown in FIG. 22. The values of the various linguistic variables of the fuzzy rules are measured with appropriate measurement means. The main component of the device is the fuzzy processor, designated by the reference numeral 20. The processor 20 has a memory 21 of the EPROM type which is suitable to store all the parameters related to the fuzzy inference. These parameters can be the membership functions of the input and output variables and the fuzzy rules for each one of the controllers FSC and FPC. The memory 21 furthermore includes a code for managing the processing of the fuzzy processor 20.

The device furthermore includes one or more analog inputs 22. For the sake of convenience, only one of these inputs has been shown. The input 22 is connected to a sample-and-hold circuit 23 which sends the signal measured at the input 22 to an analog-to-digital converter 24 which is suitable to convert the measured signal into digital form. The A/D converter 24 is connected to a first input of a comparator 25. The comparator 25 is suitable to compare the signal measured at the input 22 with a reference signal. The comparator 25 is similar to the adder nodes 11 and 16 of FIGS. 8 and 9. The signal measured at the input 22 can be the speed of the motor w or the power P$_{in}$ supplied to the AC motor 2, whereas the reference signal can be the reference speed w$_{ref}$ or the reference power P$_{ref}$.

Either the speed error signal E$_w$ or the power error signal E$_p$ is present at the output of the comparator 25. In the case of the speed error signal E$_w$, the signal is sent to an adder circuit 26 which is suitable to calculate the derivative dE$_w$/dt of the error signal E$_w$. The adder circuit 26 determines the variation of the speeds from the comparison of the values of signal E$_w$ in two successive instants E$_w$(t)–E$_w$(t–1). The reference signals are provided by an I/O connector 27 which is advantageously connected to a microprocessor (not shown) that is suitable to generate the reference signals and to monitor the operation of the device. The error signal E$_w$ or E$_p$ is provided to a latch circuit 28 which retains the information of the error signal E$_w$ or E$_p$ until it is provided to a register 29. Accordingly, the measured error signal is retained until its derivative dE$_w$/dt is calculated.

All the signals that are part of the antecedents of the fuzzy rules, i.e. the speed error E$_w$, the power error E$_p$, and the derivative of the speed error dE$_w$/dt, are provided to a register 29 which is suitable to provide said variables of the antecedents simultaneously to the fuzzy processor 20. The fuzzy processor 20, on the basis of the linguistic variables in input, of the membership functions, and of the fuzzy rules stored in the memory 21, performs the fuzzy inference, with appropriate fuzzy inference means, in the manner described above, and generates at its output a crisp value for the supply voltage V$_{phase}$ and for the value K. Before the fuzzy inference, the data of the EPROM memory are loaded into the RAM memory of the fuzzy processor 20. The crisp values are provided to a D/A converter 30 which, by means of a delay circuit 31 and of a sample-and-hold circuit 32, supplies an analog output signal to the output 33 of the device.

The device also has one or more digital inputs which are directly connected to the register 29. The digital inputs can be used to apply the power error E$_p$, already in digital form, determined by the comparison of the power P$_{in}$ supplied to the motor and an optimum reference power P$_{ref}$. The fuzzy processor also has its own clock 35 and its own external buffer 36 which is connected to the I/O connector 27.

The improvements obtained with the control according to the present invention are evident in FIGS. 16–21. The comparison was made with a PID (proportional - integral - derivative) control system. FIG. 16a shows the output of the system (motor axle speed - w) driven by a process according to the present invention, whereas FIG. 17a shows the output of the system driven with the PID system. FIGS. 16b and 17b show the relative voltages to be applied to each one of the three phases of the motor. The charts point out the better performance of the device according to the present invention in terms of overshooting, settling time and steady-state error. Comparison between the voltages to be applied V$_{phase}$ (FIGS. 16b and 17b) shows that the process according to the present invention reduces the dV$_{phase}$/dt to be applied to the switching device of the drive block, thus avoiding oversizing and additional noise in the system.

Figure 18A:
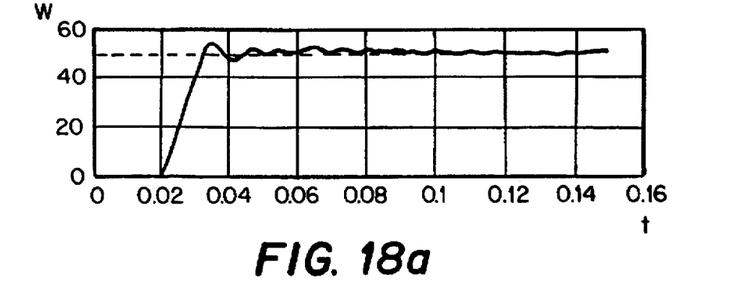
FIGS. 18a and 18b are graphs showing examples of rotor speed with torque noise.
Figure 18B:
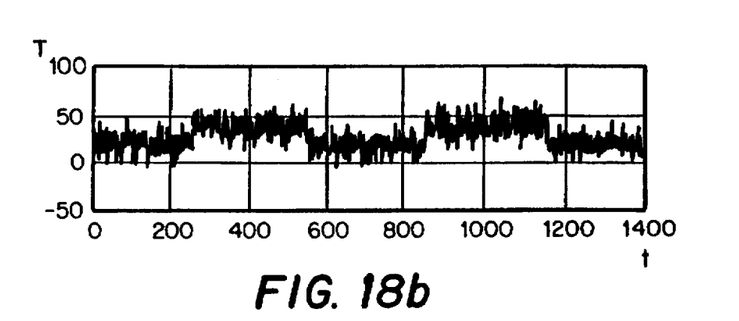

FIGS. 18a and 18b show the output of the system controlled with the process according to the present invention, if the load torque undergoes a 20% stepwise variation with respect to the reference value and has an additional 10% noise with respect to the torque reference value.

Figure 19A:
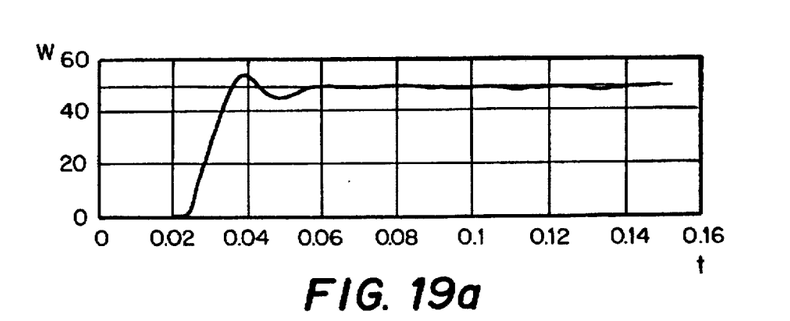
FIGS. 19a and 19b are graphs showing examples of noise on the feedback loop.
Figure 19B:
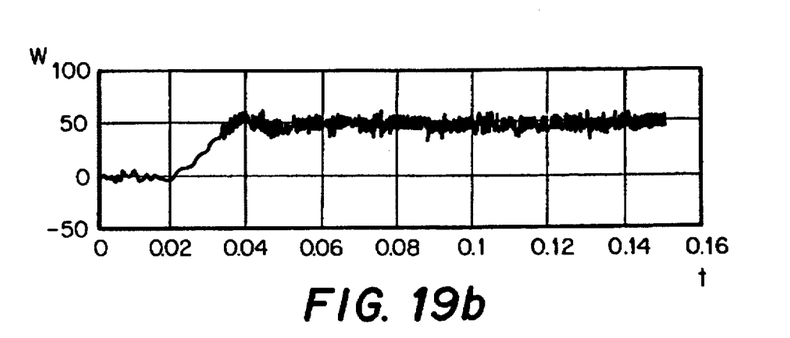

FIG. 19 shows the output of the device according to the present invention, with noise introduced on the feedback loop. When noise is present without the addition of the filters, it becomes difficult to control the system with a PID regulator, whereas the fuzzy control according to the present invention has intrinsic filtration abilities.

Figure 20:
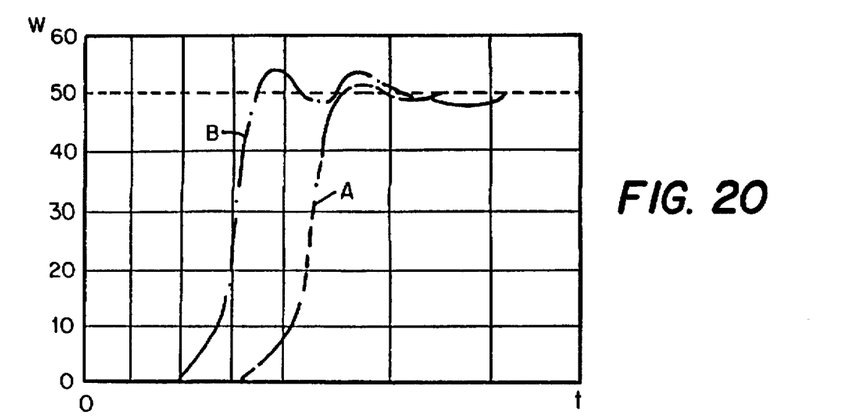
FIG. 20 is a graph that plots the output of the device according to the present invention, respectively without and with power optimizations.

FIG. 20 is a graph that plots the angular speed w with (curve A) and without (curve B) power optimization.

FIG. 21 is a graph that plots the comparison between the power values Pin supplied to the motor with (curve a) and without (curve b) power optimization.

The invention thus conceived is susceptible to numerous modifications and variations, all of which are within the scope of the inventive concept. Thus, for example, the present invention is not limited to the control of three-phase induction motors but is also valid for non-three-phase motors by means of an appropriate power interface (inverter).

All the details may be replaced with other technically equivalent ones. In practice, the materials employed, as well as the shapes and dimensions, may be any according to the requirements without thereby abandoning the protective scope of the claims that follow.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An applied voltage fuzzy control process for an electric motor comprising the steps of:
   measuring a speed error by comparing a present speed of the electric motor with a reference speed;
   generating a derivative of the speed error;
   measuring a power error by comparing a power supplied to the electric motor with a reference power; and
   applying a fuzzy control to the speed error, to the derivative of the speed error and to the power error, to generate values of a drive voltage and a power supply pulse that are suitable to drive the electric motor.

2. The process according to claim 1 wherein the step of applying a fuzzy control includes the steps of:
   defining membership functions for the speed error;
   defining membership functions for the derivative of the speed error;
   defining membership functions for the drive voltage;
   defining fuzzy rules that have an antecedent that includes the speed error and the derivative of the speed error and a consequent that includes the drive voltage;
   applying measured values and the membership functions to the fuzzy rules to obtain preliminary results;
   calculating related weight functions of the membership functions; and
   defuzzifying the preliminary results to obtain a real value of the drive voltage.

3. The process according to claim 2 wherein the step of applying a fuzzy control also includes the steps of:
   defining membership functions for a proportional value that is proportional to a ratio between the drive voltage and the power supply pulse; and
   defuzzifying the preliminary results again to obtain a real value of the proportional value.

4. The process according to claim 3 wherein the step of applying a fuzzy control also includes, after the steps of defuzzifying, the step of:
   multiplying the drive voltage by the proportional value to obtain the power supply pulse.

5. An applied voltage fuzzy control process for an electric motor as claimed in claim 1, wherein said power supply pulse and said drive voltage have substantially a same frequency suitable for directly driving said electric motor.

6. An applied voltage fuzzy control device for an electric motor comprising:
   first comparison means for comparing a present speed of the electric motor with a reference speed to produce a speed error;
   means, coupled to the first comparison means, for generating a derivative of the speed error;
   second comparison means for comparing a power supplied to the electric motor with a reference power to produce a power error; and
   fuzzy control means, coupled to the means for generating and to the first and second comparison means, for applying a fuzzy control to the speed error, to the derivative of the speed error, and to the power error, to generate values of a drive voltage and a power supply pulse that are suitable to drive the electric motor.

7. The device according to claim 6 wherein the fuzzy control means comprises:
   means for storing membership functions for the speed error;
   means for storing membership functions for the derivative of the speed error;
   means for storing membership functions for the drive voltage;
   means for storing fuzzy rules that have an antecedent that includes the speed error and the derivative of the speed error and a consequent that includes the drive voltage;
   fuzzy inference means, coupled to the means for storing, for applying measured values and the membership functions to the fuzzy rules to obtain preliminary results;
   calculation means, coupled to the means for storing the membership functions, for calculating related weight functions of the membership functions; and
   defuzzification means, coupled to the fuzzy inference means, for defuzzifying the preliminary results to obtain a real value of the drive voltage.

8. The device according to claim 7 wherein the measured values include the speed error and the power error.

9. The device according to claim 6 wherein the means for generating the derivative includes an adder circuit that calculates a difference between two values of the speed error measured at different times.

10. The device according to claim 6 wherein the fuzzy control means includes a fuzzy processor.

11. The device according to claim 6 further comprising a latch circuit that retains a value of the speed error until the derivative of the speed error is calculated.

12. The device according to claim 7 further including a register that simultaneously provides values of the antecedents and the fuzzy rules to the fuzzy control means.

13. An applied voltage fuzzy control device for an electric motor as claimed in claim 6, wherein said power supply pulse and said drive voltage have substantially a same frequency suitable for directly driving said electric motor.

14. A fuzzy control device for a motor comprising:
   a first comparison circuit that compares a present speed of the motor with a reference speed to produce a speed error;
   a derivative circuit, coupled to the first comparison circuit, that generates a derivative of the speed error;
   a second comparison circuit that compares a power supplied to the electric motor with a reference power to produce a power error; and
   a fuzzy control processor, coupled to the derivative circuit and to the first and second comparison circuits, that applies a fuzzy control to the speed error, to the derivative of the speed error and to the power error, to generate values of a drive voltage and a power supply pulse that are suitable to drive the electric motor.

15. The device according to claim 14 wherein the fuzzy control circuit includes:
   a first storing circuit that stores membership functions for the speed error;
   a second storing circuit that stores membership functions for the derivative of the speed error;
   a third storing circuit that stores membership functions for the drive voltage; and
   a fourth storage circuit for storing fuzzy rules that have an antecedent that includes the speed error and the derivative of the speed error and a consequent that includes the drive voltage.

16. The device according to claim 15 wherein the fuzzy control circuit further includes:
   a fuzzy inference circuit, coupled to the storing circuits, that applies measured values and the membership functions to the fuzzy rules to obtain preliminary results;

a calculation circuit, coupled to the second storing circuit, that calculates related weight functions of the membership functions; and a defuzzification circuit, coupled to the fuzzy inference circuit, that defuzzifies the preliminary results to obtain a real value of the drive voltage.

17. The device according to claim 14 wherein the derivative circuit includes an adder circuit that calculates a difference between two values of the speed error measured at different times.

18. The device according to claim 14 wherein the fuzzy control circuit includes a fuzzy processor.

19. The device according to claim 14 further comprising a latch circuit that retains a value of the speed error until the derivative of the speed error is calculated.

20. The device according to claim 14 further including a register that simultaneously provides values of the antecedents and the fuzzy rules to the fuzzy control circuit.

21. A fuzzy control device for a motor as claimed in claim 14, wherein said power supply pulse and said drive voltage have substantially a same frequency suitable for directly driving said electric motor.

22. A process for applying fuzzy control to a motor comprising the steps of:

comparing a present speed of the motor with a reference speed to produce a speed error;

producing a derivative of the speed error;

comparing a power supplied to the motor with a reference power to calculate a power error; and applying fuzzy control to the speed error, to the derivative of the speed error, and to the power error, to generate drive signals for the motor.

23. The process according to claim 22 wherein the step of applying includes the steps of:

defining membership functions for the speed error;

defining membership functions for the derivative of the speed error;

defining membership functions for the drive voltage; and defining fuzzy rules that have an antecedent that includes the speed error and the derivative of the speed error and a consequent that includes the drive voltage.

24. A process for applying a fuzzy control to a motor as claimed in claim 22, wherein said drive signals have a drive voltage amplitude and frequency suitable for directly driving said motor.

* * * * *

UNITED STATES PATENT AND TRADEMARK OFFICE
CERTIFICATE OF CORRECTION

PATENT NO. : 5,663,626
DATED : September 2, 1997
INVENTOR(S) : Giuseppe D'ANGELO, Rinaldo POLUZZI and Matteo LO PRESTI It is certified that error appears in the above-identified patent and that said Letters Patent is hereby corrected as shown below:

On the title page, item:

[73] Assignees: SGS-Thomson Microelectronics S.r.l., Agrate Brianza: Consorzio per la Ricerca sulla Microelettronica nel Mezzogiorno, Catania, both of Italy Signed and Sealed this Second Day of December, 1997

*Attest:*

BRUCE LEHMAN

*Attesting Officer*     *Commissioner of Patents and Trademarks*